United States Patent
Kawanaka

(10) Patent No.: US 6,351,763 B1
(45) Date of Patent: Feb. 26, 2002

(54) ELECTRONIC MAIL SYSTEM, ELECTRONIC MAIL TRANSMISSION/RECEPTION METHOD, AND RECORDING MEDIUM ELECTRONIC MAIL TRANSMISSION/RECEPTION PROGRAM IS RECORDED

(75) Inventor: Motoyoshi Kawanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/206,706

(22) Filed: Dec. 7, 1998

(30) Foreign Application Priority Data

Dec. 5, 1997 (JP) .............................................. 9-335258

(51) Int. Cl.[7] .............................................. G06F 13/00
(52) U.S. Cl. ........................ 709/206; 709/313; 709/329
(58) Field of Search ................................ 709/206, 205, 709/204, 313, 328, 329

(56) References Cited

U.S. PATENT DOCUMENTS

| | | | | |
|---|---|---|---|---|
| 5,428,778 A | * | 6/1995 | Brookes .......................... | 707/5 |
| 5,867,281 A | * | 2/1999 | Nozoe et al. ................ | 358/402 |
| 5,958,005 A | * | 9/1999 | Thorne et al. ............... | 709/202 |

FOREIGN PATENT DOCUMENTS

| | | |
|---|---|---|
| JP | 1-143541 A | 6/1989 |
| JP | 3-30542 | 2/1991 |
| JP | 6-69953 | 3/1994 |
| JP | 6-268677 | 9/1994 |
| JP | 10-177594 A | 6/1998 |
| WO | WO 98/58321 | 12/1998 |

* cited by examiner

Primary Examiner—Viet D. Vu
(74) Attorney, Agent, or Firm—Foley & Lardner

(57) ABSTRACT

The objective of the present invention is to provide an electronic mail system, where opening electronic mail with permission is performed at a designated date only on request for permission to open. In the electronic mail system, a terminal on the transmission side attaches a designated date indicating when opening the electronic mail is allowed, transmitting the electronic mail with the attachment to a server on the transmission side. The server on the transmission side attaches a program used to delete electronic mail, to the electronic mail received, transmitting the electronic mail with the attachment. A server on the receiving side, which has received the electronic mail from the server on the transmission side, saves the electronic mail and transmits it to a terminal on the receiving side. The terminal on the receiving side either opens the electronic mail if the current date is equal to the designated date of opening, or executes the program attached to the electronic mail, if otherwise, so that the electronic mail is deleted, on request for permission to open. The status that the mail has been deleted is informed to the server on the receiving side. The server on the receiving side transmits the saved electronic mail, again.

36 Claims, 10 Drawing Sheets

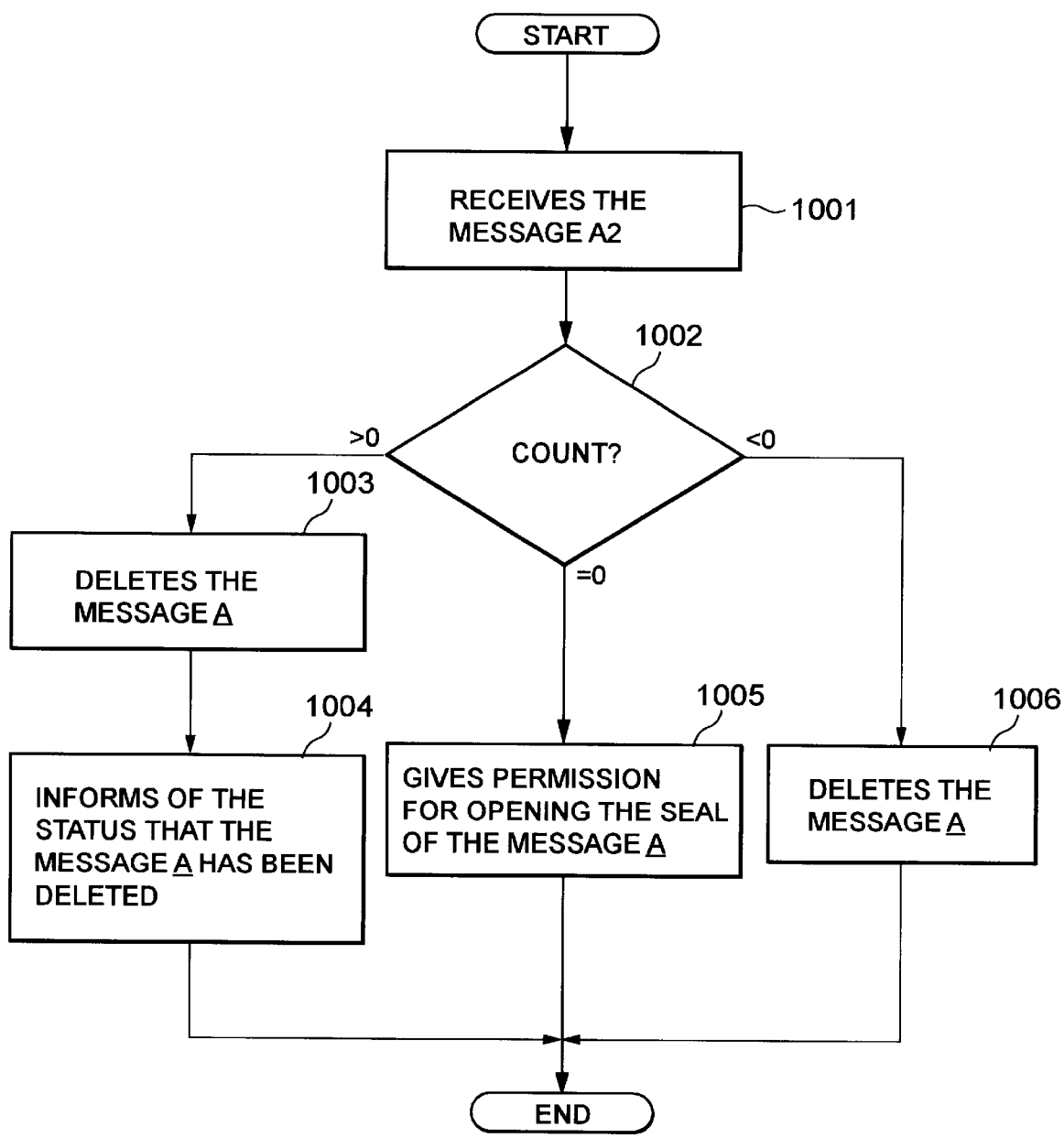

ELECTRONIC MAIL SYSTEM, ELECTRONIC MAIL TRANSMISSION/ RECEPTION METHOD, AND RECORDING MEDIUM ELECTRONIC MAIL TRANSMISSION/RECEPTION PROGRAM IS RECORDED

BACKGROUND OF THE INVENTION

1. Field of the Invention

The present invention relates to an electronic mail system, and more particularly to an electronic mail system, in which a user, when sending an electronic letter or memo, can designate the date or duration when the letter or memo is allowed to be opened by the receiver of it, in other words, is allowed to see by the receiver.

2. Description of the Related Art

One of the conventional electronic mail systems is disclosed in Japanese Patent Application Laid-open No. Hei-6-268677, for example. In this electronic mail system, a user at a transmission terminal can easily and efficiently set a transmission deadline of an electronic letter or memo with the help of the following two pieces of information which are automatically sent to the user:

1. First information that is the expected time when the user on the receiving side may open the electronic letter or memo; the user on the transmission side is allowed to know the time before setting the transmission deadline; and
2. Second information that is the possibility that the user on the receiving side opens the electronic letter or memo by the designated deadline; the user on the transmission side is informed of the possibility before the electronic letter or memo is transmitted.

However, in the conventional electronic mail systems, when electronic letter or memo is designated for its transmission, the letter or memo is transmitted in real time to a reception terminal. On the other hand, upon receipt of the electronic letter or memo made by the reception terminal, the letter or memo is allowed to be opened and to be read. The same operation is also performed for an electronic letter or memo which contains information which is actually needed in a month, for example. In this case, the user on the receiving side may read the information from the electronic letter or memo upon its reception, but may forget the information after a month when it is actually needed. Such problems may occur in the electronic mail system disclosed in the above Laid-Open, due to the fact that, though a deadline setting at a transmission terminal is taken into consideration, the operation of opening the electronic letter or memo at a designated date or within a designated duration is not provided in the system.

SUMMARY OF THE INVENTION

The present invention is provided solving the above-mentioned problem with the above-mentioned conventional technology. Accordingly, an objective of the present invention is to provide an electronic mail system in which an electronic letter or memo (hereinafter referred to as an electronic letter) is allowed to be opened on a designated date or within a designated duration on demand.

Another objective of the present invention is to provide an electronic mail system in which an electronic letter is surely made open on a designated date or within a designated duration on demand.

Still another objective of the present invention is to provide an electronic mail transmission/reception method and a recording medium which includes a program for transmission/reception of an electronic letter by electronic mail.

According to an aspect of the present invention, an electronic mail system is provided which transmits and receives an electronic letter between two computers of choice from a plurality of computers making up a network system. This comprising said plurality of computers, each will include: a program attachment means for attaching both a designated date or duration indicating when opening the seal of an electronic message is allowed, and a delete program which deletes an electronic letter, to an electronic letter input by a user, and transmitting the electronic letter with the attachment to a computer on the receiving side; and message management means for receiving an electronic letter transmitted from a computer on the transmission side, and then processing according to demands made by the user for opening the electronic letter, in such a manner that: if the current date is equal to or falls on a designated date or within a designated duration for opening attached to the electronic letter, the electronic letter is opened; or otherwise, the delete program attached to the electronic letter is executed.

According to another aspect of the present invention, an electronic mail system is provided which transmits and receives electronic letter between two computers of choice from a plurality of computers making up a network system, comprising said plurality of computers, each including: program attachment means for attaching a delete program to electronic letter input by a user, and transmitting the resulting attachment and electronic letter to a computer on the receiving side; wherein the delete program is configured to process in such a manner that: if the current date is equal to or falls on a designated date or within a designated duration indicating when opening the electronic letter is allowed, the electronic letter is opened; or otherwise, the electronic letter is deleted; and message management means for receiving the electronic letter from a computer on the transmission side, and then executing the delete program attached to the electronic letter on demand made by a user for opening the electronic letter.

According to still another aspect of the present invention, one of the above electronic mail systems is provided using a designated-event generated count or range of generated counts, wherein, until now, the current date, and the designated date or duration for opening have been determined with the help of an event-generated count.

According to still another aspect of the present invention, there is provision for a method of transmitting and receiving electronic letter between any two computers from a plurality of computers making up a network system, comprising the steps of: attaching both a designated date or duration indicating when opening the electronic letter is allowed, and a delete program which deletes electronic letter, to electronic letter input by a user, and transmitting it to the computer on the receiving side; and receiving the electronic letter from a computer on the transmission side, and then either opening the electronic letter if the current date is equal to or falls on a designated date or within a designated duration for opening the electronic letter, or executing the delete program attached to the electronic letter according to the requests made by the user for opening the electronic letter.

According to still another aspect of the present invention, there is a method provided for transmitting and receiving electronic letter between any two computers from a plurality of computers making up a network system, comprising the steps of: attaching a delete program to electronic letter input by a user, and transmitting the electronic letter with the attachment to a computer on the receiving side; wherein the delete program is configured to process in such a manner that: if the current date is equal to or falls on a designated date or within a designated duration indicating when opening an electronic message is allowed, the electronic letter is opened; otherwise, the electronic letter is deleted; and receiving the electronic letter from a computer on the transmission side, and then executing the delete program attached to the electronic letter according to a request made by a user for opening the electronic letter.

According to still another aspect of the present invention, one of the above-mentioned methods is provided using a designated-event generated count or a range of generated counts, wherein the current date and the designated date or duration for opening are determined with the help of an event generated count until now.

According to still another aspect of the present invention, a storage medium is provided, recording thereon a program enabling each computer from a plurality of computers which make up a network system, to execute the processes of: attaching both a designated date or duration indicating when opening electronic letter is allowed, and a delete program which deletes electronic letter, to electronic letter input by a user, and transmitting the electronic letter and attachment to a computer on the receiving side; and receiving electronic letter from a computer on the transmission side, and on request made by the user for opening the electronic letter, either opening the electronic letter if the current date is equal to or falls on a designated date or within a designated duration for opening attached to the electronic letter, or executing the delete program attached to the electronic letter, otherwise.

According to still another aspect of the present invention, a storage medium is provided, recording thereon a program enabling each of a plurality of computers which make up a network system, to execute the processes of: attaching a delete program to electronic letter input by a user, and transmitting the electronic letter with the attachment to a computer on the receiving side; wherein the delete program is configured to process in such a manner that: if current date is equal to or falls on a designated date or within a designated duration indicating when opening an electronic letter is allowed, the electronic letter is opened; otherwise, the electronic letter is deleted; and receiving the electronic letter from a computer on the transmission side, and then executing the delete program attached to the electronic letter on request made by a user for opening the electronic letter.

According to still another aspect of the present invention, one of the storage media is provided, using a designated-event generated count or a range of generated counts, wherein the current date, and the designated date or duration for opening has been determined with the help of an event generated count until now.

BRIEF DESCRIPTION OF DRAWINGS

Other features and advantages of the invention will be made more apparent by the detailed description that follows, taken in conjunction with the accompanying drawings, wherein:

FIG. 10 is a flow diagram showing the procedure in a terminal on the reception side according to the second embodiment of the present invention.

DETAILED DESCRIPTION OF THE PREFERRED EMBODIMENTS

Next, the first embodiment of the present invention will be described hereafter in detail with reference to the drawings.

Figure 1:
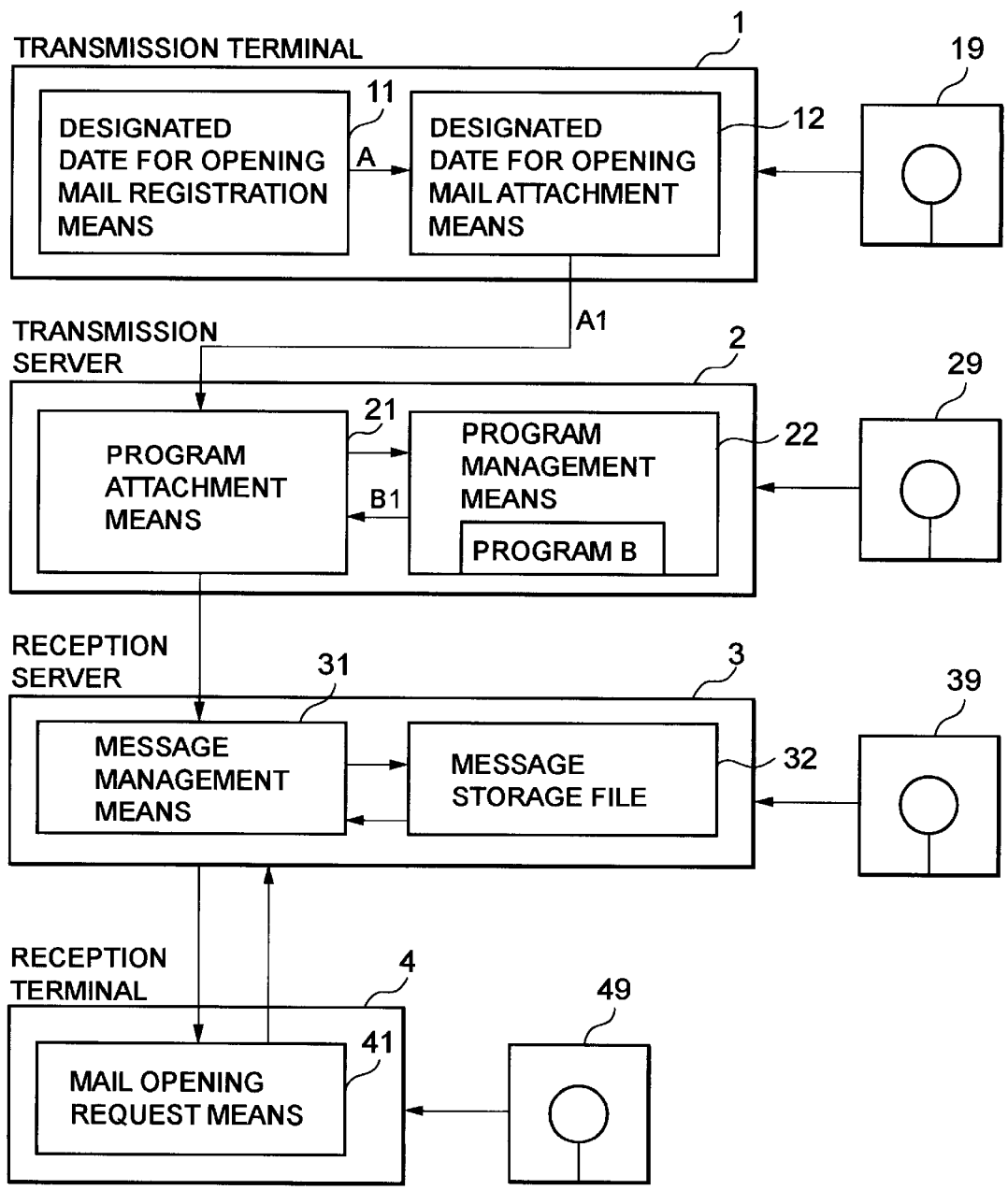
FIG. 1 is a block diagram showing the configuration of a first embodiment of the present invention.
Figure 2:
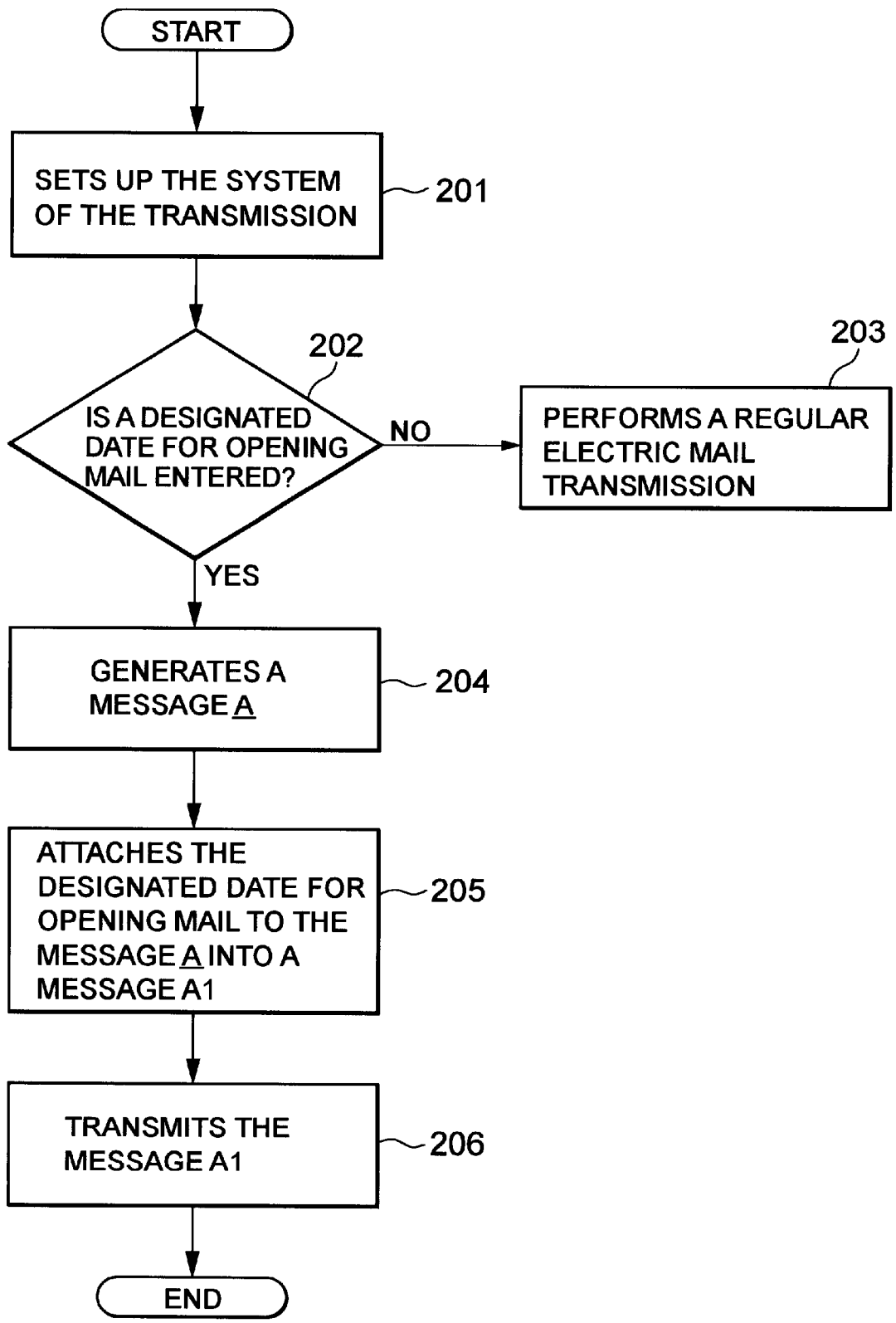
FIG. 2 is a flow diagram showing the procedure in a terminal on the transmission side according to the first embodiment of the present invention.
Figure 3:
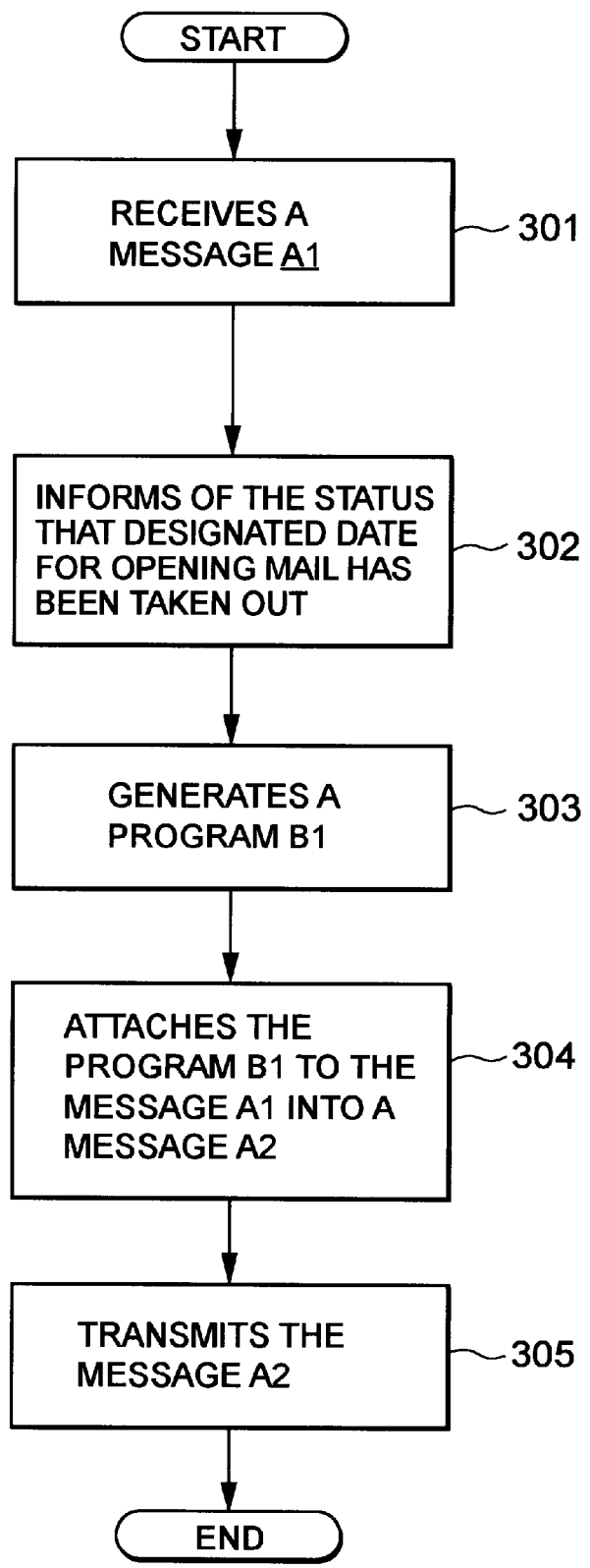
FIG. 3 is a flow diagram showing the procedure in a server on the transmission side according to the first embodiment of the present invention.
Figure 4:
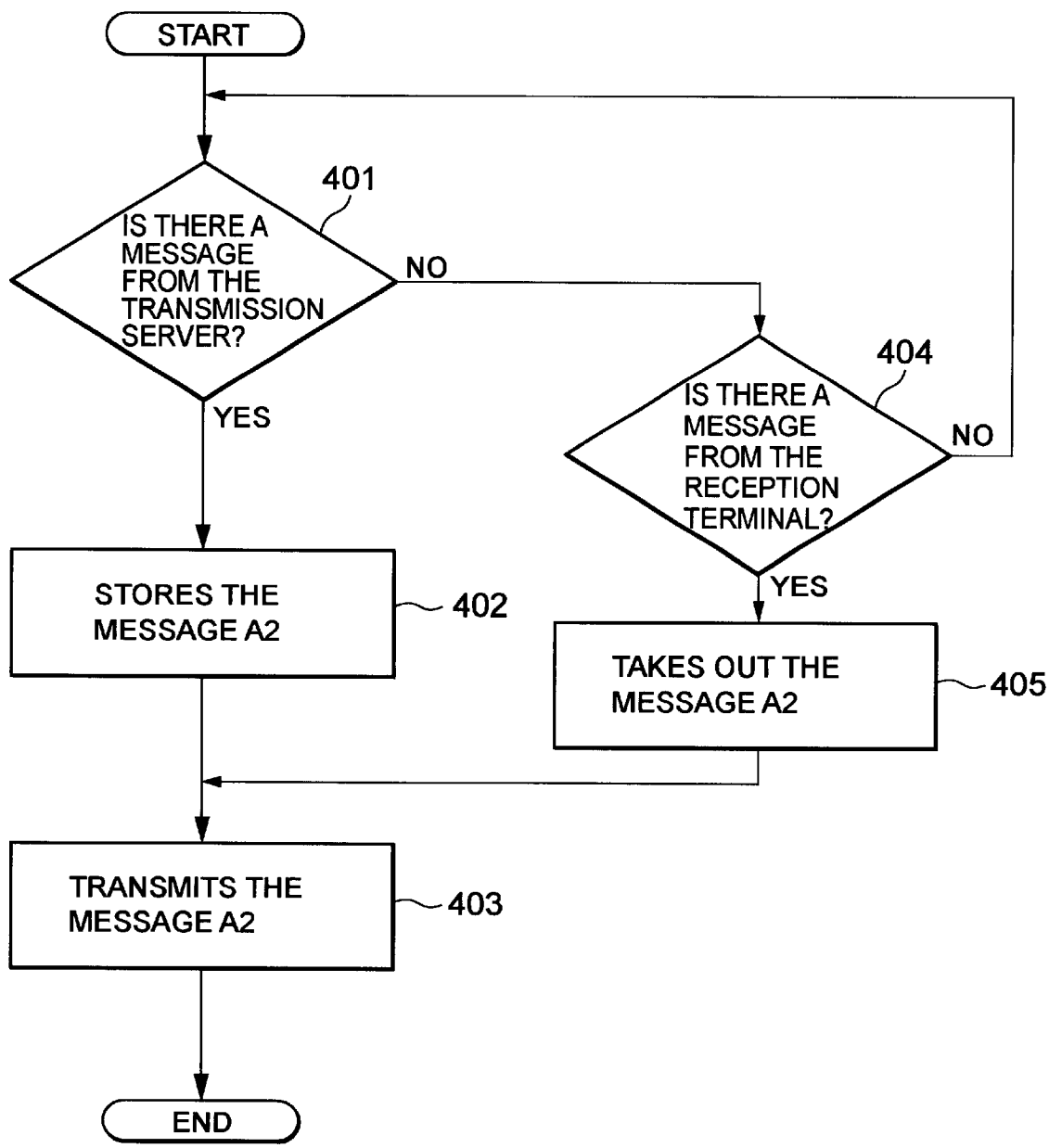
FIG. 4 is a flow diagram showing the procedure in a server on the reception side according to the first embodiment of the present invention.
Figure 5:
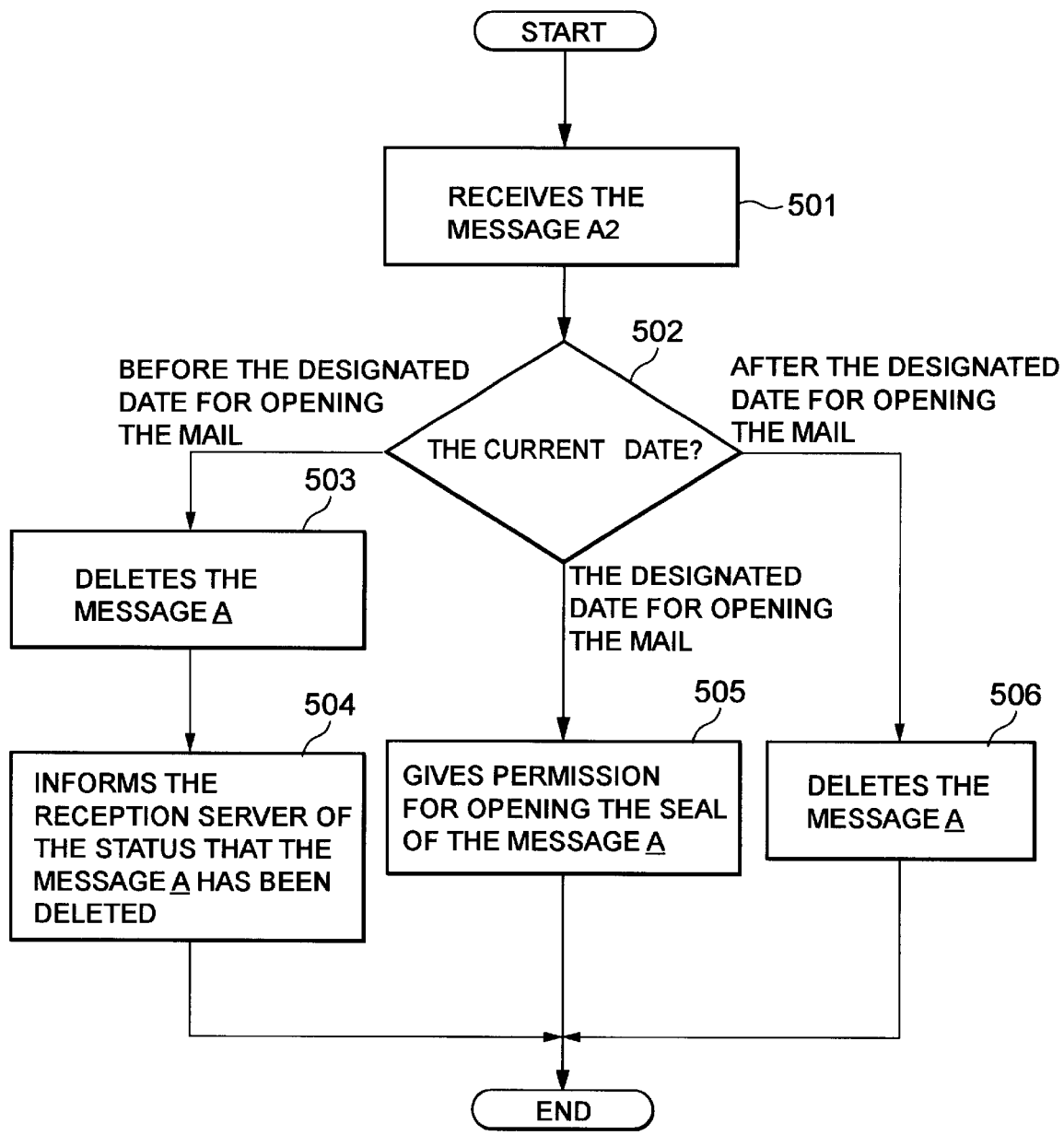
FIG. 5 is a flow diagram showing the procedure in a terminal on the reception side according to the first embodiment of the present invention.

In FIG. 1, the first embodiment of the present invention is used in a network system where: a plurality of servers and terminals are connected via a communication line; and comprised of at least a transmission terminal 1, a transmission server 2, a reception server 3, and a reception terminal 4. It is noted that each server operates as a transmission server for transmitting electronic letters to another server, whereas it also operates as a reception server for receiving electronic letters from another server. Each terminal operates as a transmission terminal for transmitting electronic letters to another terminal, whereas it also operates as a reception terminal for receiving electronic letters from another terminal.

The transmission terminal 1 comprises: a designated date for opening registration means 11, which displays a frame used for the help of the registration of designated data for opening letters and registers a designated date for opening entered by the user with the help of the displayed frame; and a designated date for opening attachment means 12. The transmission server 2 is comprised of: a program attachment means 21, which attaches a message delete program to a message; and a program management means 22, which manages the message delete program. The reception server 3 comprises: a message management means 31, which transmits a message received from the transmission server 2, to the reception terminal 4; and a message storage file 32, which is stored with a message. The reception terminal 4 comprises an opening request means 41 to request opening the received message.

Next, the operation of the first embodiment of the present invention will be explained in detail with reference to FIGS. 1 to 5.

When the user sets up the system of the transmission terminal 1 (Step 201), the designated date for opening registration means 11 displays a frame used for the help of registration of a designated date for opening (not shown in the figure). It is recommended that the frame used for the help of registration of a designated date for opening contains: at least a designated date for opening input region; and a button used to confirm the completion of entering the designated date for opening. If the user does not enter a designated date for opening in the designated date for opening input region of the frame used for the help of registration of a designated date for opening ("NO" in Step 202), the system of the transmission terminal 1 performs a regular electronic letter transmission (Step 203). Otherwise, if the user enters a designated date for opening, and clicks the button used to confirm the completion of entering a designated date for opening ("YES" in Step 202), an electronic letter with a designated date for opening is transmitted.

Since the regular operation of transmitting electronic letters is similar to those of the conventional approaches, its explanation is omitted. Accordingly, the operation of transmitting electronic letters with a designated date for opening will be explained hereafter.

In step 202, the user enters a designated date for opening, and clicks the button used to confirm the completion of entering a designated date for opening, after which in step 204, he/she enters a message A which will be sent via electronic mail. In step 205, the designated date for opening attachment means 12 of the transmission terminal 1 generates a transmission message A1 by attaching the entered designated date for opening to the message A the user has entered. In step 206, the transmission message A1 is transmitted to the transmission server 2.

On the other hand, instep 301, the program attachment means 21 of the transmission server 2 receives the message A1 transmitted from the transmission terminal 1. In step 302, the designated date for opening, attached to the message A1, is taken out and informs the program management means 22.

The program management means 22 is stored in advance with a message delete program B used to delete the message A. When the designated date for opening has been informed in step 302, the program management means 22 generates a message delete program B1 dependent upon both the stored message delete program B and the designated date for opening, and sends it to the program attachment means 21, in step 303.

The program attachment means 21 attaches the message delete program B1 sent, to message A1, in step 304, and transmits the resulting transmission message A2 to the reception server 3 in step 305.

When the message management means 31 of the reception server 3 receives the message A2 ("YES" in step 401), it stores the message A2 in the message storage file 32 in step 402, and then transmits a message A2 to the reception terminal 4 in step 403.

The reception terminal 4 receives the message A2 in step 501, waiting for a request for opening to be entered by the user. When the opening request means 41 of the reception terminal 4 receives the command, it determines whether the current date is before, equal to, or after the designated date for opening in step 502.

In this step, if it is determined "before", the reception terminal 4 executes the message delete program B1 so that the message A is deleted. The reception terminal 4 then informs the reception server 3 of the status that the message has already been deleted, in step 504. When the message management means 31 of the reception server 3 receives the information from the reception terminal 4 ("YES" in step 404), takes out the message A2 from the message storage file 32 in step 405, and transmits it to the reception terminal 4 again, in step 403.

If it is determined that the current date is after the designated date for opening in step 502, the reception terminal 4 runs the message delete program B1 so that the message A is deleted, in step 505.

Otherwise, in step 502, if it is determined that the current date is equal to the designated date for opening, the message delete program B1 is not executed so that opening of the message A is permitted, in step 506.

The operation of the first embodiment according to the present invention is then terminated.

It is noted that in the embodiment, the program B is prepared for delete of the message A, and the determination whether the current date is equal to the designated date for opening is performed by the reception terminal 4. However, such determination can be also performed by the help of specific corresponding program codes incorporated in the program B, alternatively. Specifically, it is possible for the program B to contain all program codes for deleting the message A if the current date is not equal to the designated date for opening, otherwise (if it is equal to the designated date), not deleting it. In this case, it is recommended that the program B1 be generated in such a manner that, with the designated date for opening not being set and stored with a specific value in the program B, as remaining blank or remaining as a variable, the blank or variable is replaced with the designated date for opening, informed by the program attachment means 21. Thereby, the reception terminal 4 unconditionally runs the program B1 on demand for opening the seal of message A so that deciding whether the message A should be deleted or should be given permission for opening, can be determined during the procedure.

Furthermore, it is noted that in the embodiment, when a designated date for opening registered is equal to the current date, opening is permitted. However, in the above configuration, a problem will occur where if a request for opening is not made at the designated date for opening, it is impossible to open the seal of the received message. To solve the problem, the transmission side may transmit a plurality of messages attached with a plurality of independent dates for giving permission for opening. However, it is not efficient due to the fact that the same messages have to be transmitted. Therefore, it is recommended in the embodiment that a designated duration for opening a seal (where a plurality of independent dates for giving permission for opening are represented by a corresponding duration) is registered, and the reception terminal 4 gives permission for opening if the current date is contained in the designated duration for opening, otherwise (if the current date is out of the designated duration) it runs a program for deleting the message.

In a modification of the embodiment, the program B can contain all program codes for deleting the message A if the current date is out of the designated date for opening, otherwise (if it falls within the designated date), not deleting. In this case, it is recommended that the program B1 be generated in such a manner that, with the designated duration for opening not being set and stored in the program B, as remaining blank or remaining as a variable, the blank or variable is replaced with the designated duration for opening informed by the program attachment means 21. Thereby, the reception terminal 4 unconditionally runs the program B1 on demand for opening the seal of message A so that whether the message A should be deleted or should be given permission for opening, can be determined during the procedure.

Furthermore, in the first embodiment of the present invention, as can be seen in FIG. 1, it is also recommended to install recording media 19, 29, 39, and 49, each recording a program for transmission and reception of an electronic letter. The recording media 19, 29, 39, and 49 can be a magnetic disk, a semiconductor memory, or other related recording media.

The above program is uploaded from each of the recording medium 19, 29, 39, and 49, and thereby the operations of the respective transmission terminal 1, transmission server 2, reception server 3, and reception terminal 4 are controlled. Even in this case, the operations of the respective transmission terminal 1, transmission server 2, reception server 3, and reception terminal 4 are exactly the same as those of the embodiment.

As is explained above, in the first embodiment of the present invention, the program for deleting a message is attached to the message of an electronic letter, and the message with the attachment is transmitted so that the program can be executed on request for opening, which is set for a date or within a duration except for the designated date or the designated duration. Therefore, the first embodiment provides a beneficial result that the seal of an electronic letter is opened only on demand for opening at the designated date or within the designated duration for opening.

Furthermore, in the first embodiment according to the present invention, when opening is demanded before the designated date or the designated duration and the electronic letter is deleted, a reception server re-transmits the electronic letter. Thereby, the first embodiment provides another beneficial result that the seal of an electronic letter is surely opened at the designated date or within the designated duration.

Next, a second embodiment of the present invention will be explained hereafter in detail with reference to drawings.

Figure 6:
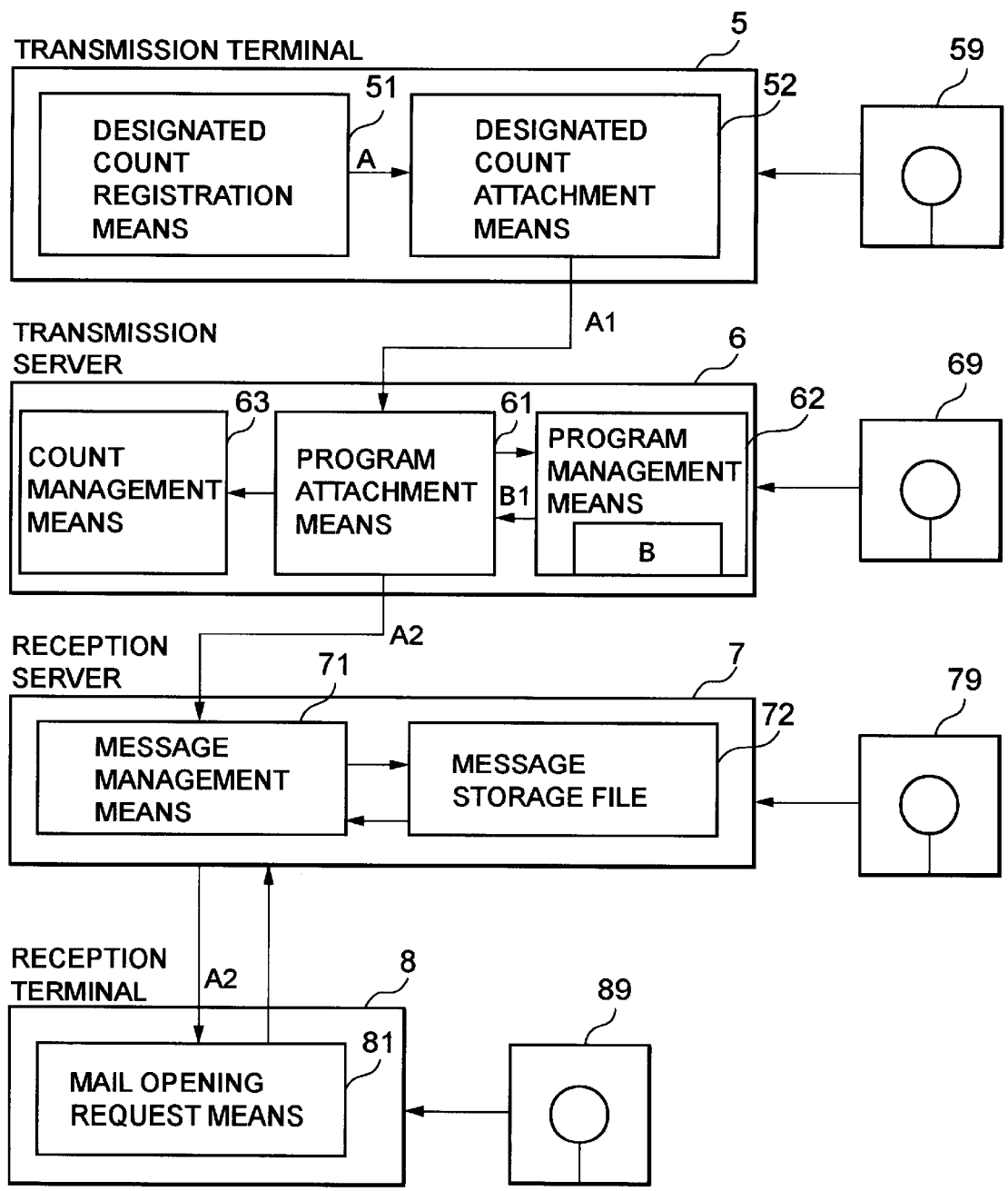
FIG. 6 is a block diagram showing the configuration of the second embodiment according to the present invention.
Figure 7:
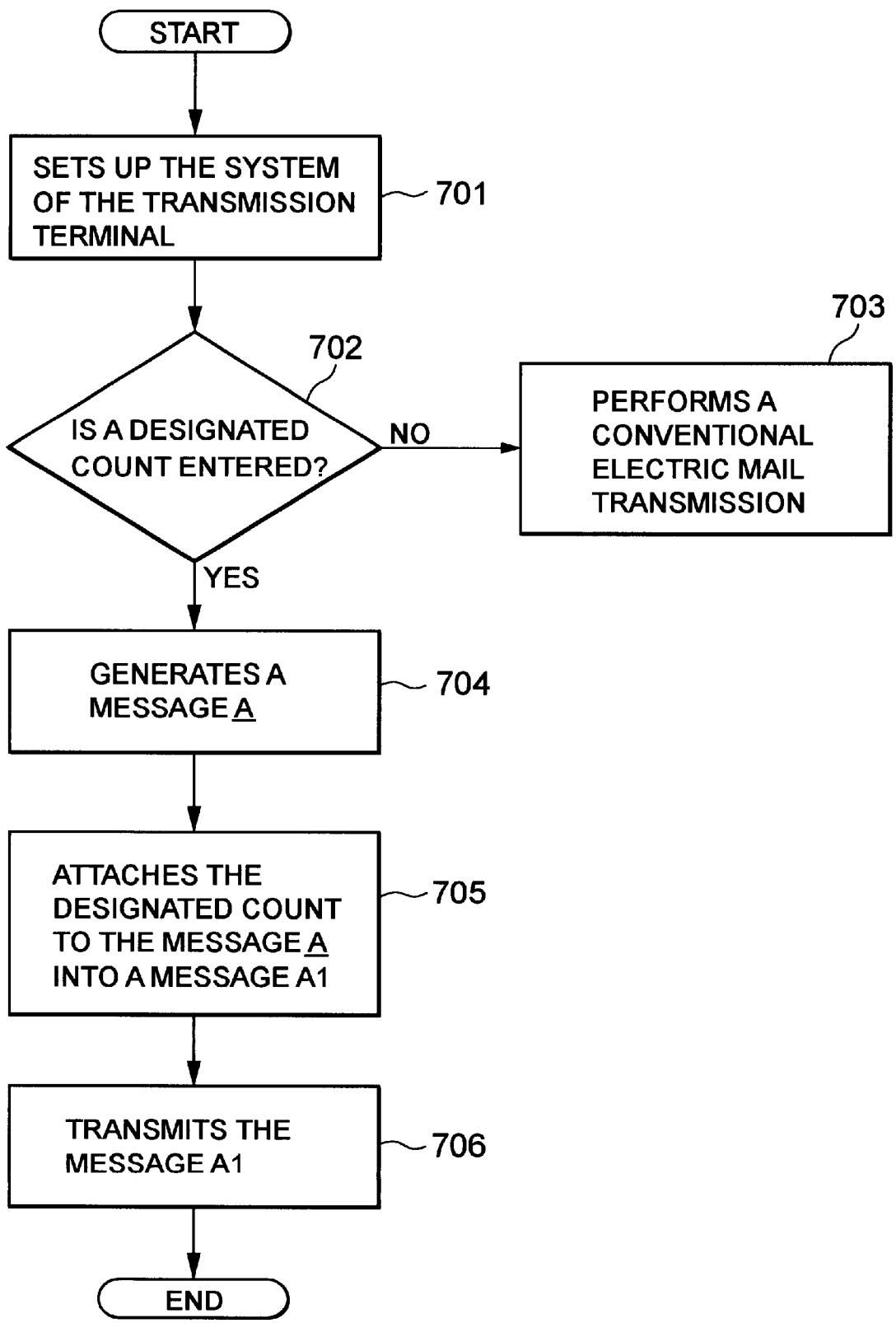
FIG. 7 is a flow diagram showing the procedure in a terminal on the transmission side according to the second embodiment of the present invention.
Figure 8:
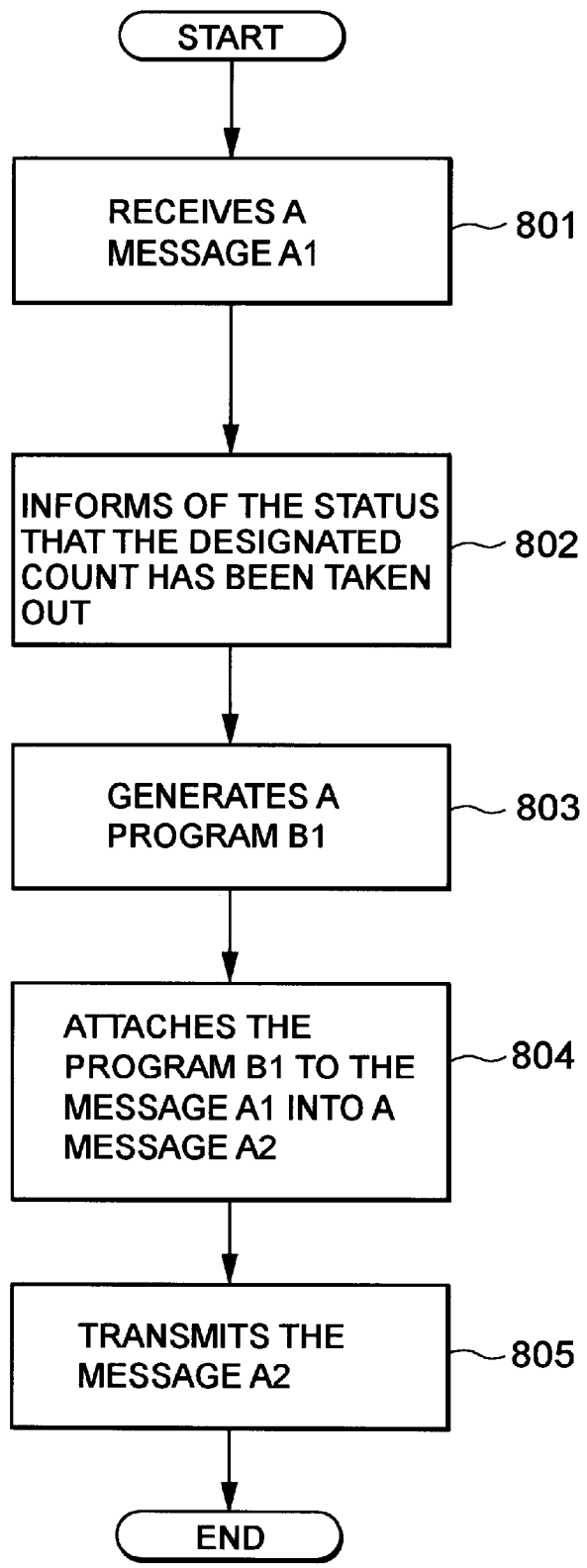
FIG. 8 is a flow diagram showing the procedure in a server on the transmission side according to the second embodiment of the present invention.
Figure 9:
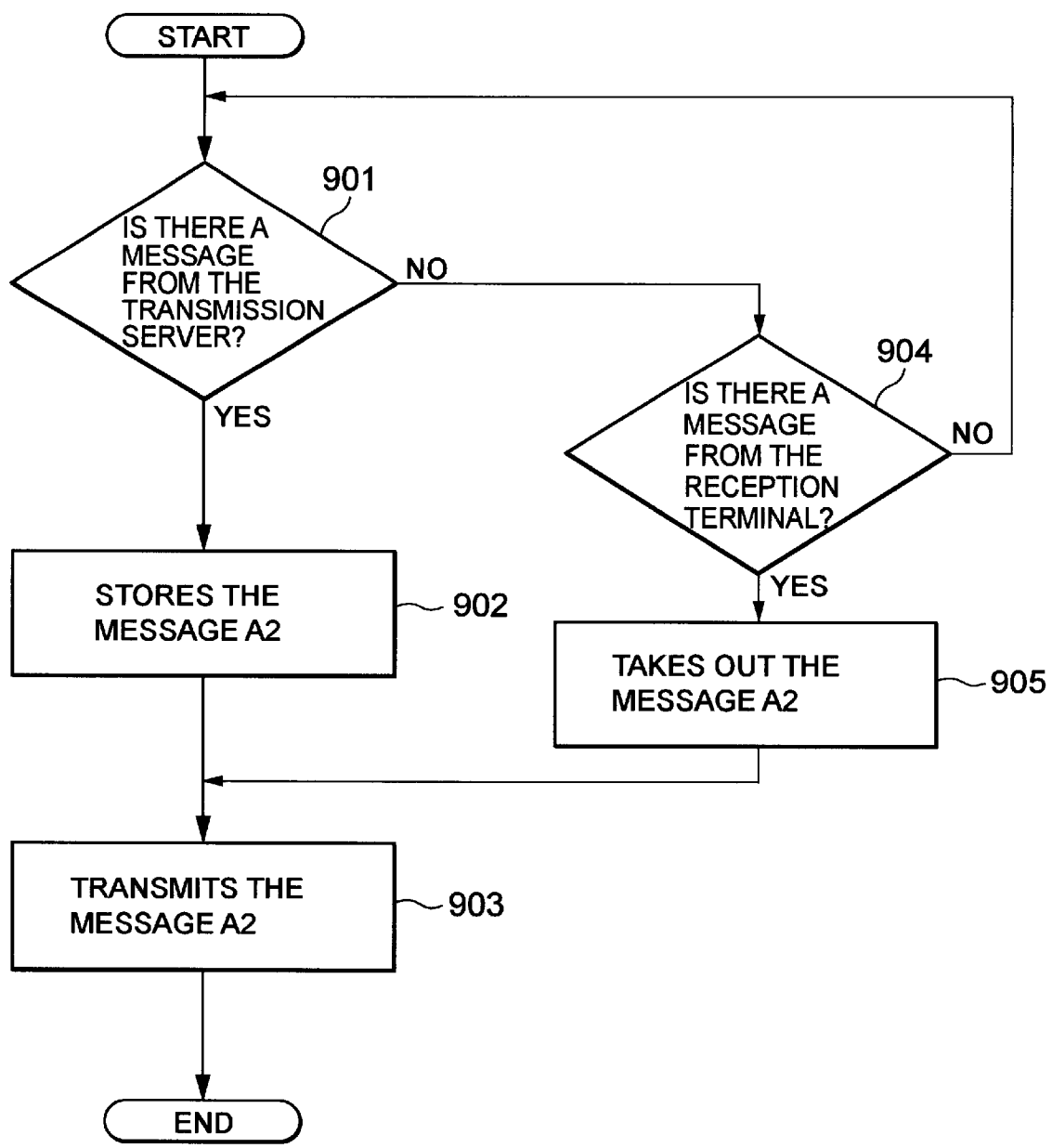
FIG. 9 is a flow diagram showing the procedure in a server at the reception side according to the second embodiment of the present invention.

The second embodiment of the present invention as shown in FIG. 6, applied to a network system where a plurality of servers and terminals are connected via communication lines, in the same manner as in the first embodiment, is made up of at least a transmission terminal 5, transmission server 5, a reception server 7, and a reception terminal 8. Each server operates as a transmission server when transmitting electronic letters to another server, whereas it also operates as a reception server when receiving electronic letters from another server. In addition, each terminal operates as a transmission terminal when transmitting electronic letters to another terminal, whereas it also operates as a reception terminal when receiving electronic letters form another terminal. The above two operations of the second embodiment are the same as those of the first embodiment.

The transmission terminal 5 comprises: a designated count registration means 51, which displays a frame for the help of a designated count's registration and registers an ID card insertion count that the user has entered with the help of the displayed frame; and a designated count attachment means 52, which attaches the ID card insertion count to a message. The transmission server 6 comprises: a program attachment means 61, which attaches a message delete program to a message; a program management means 62, which manages the message delete program; and a count management means 63, which counts down every time when the ID card is inserted. The reception server 7 comprises: a message management means 71, which transmits the message received from the transmission server 6, to the reception terminal 8; and a message storage file 72, which is stored with a message. The reception terminal 8 comprises a opening request means 81 to request to open the seal of a received message.

We assume that in the system of the second embodiment, with changing passwords every day, the user inserts his/her ID card into a specific slot so that user information is read out from the ID card. In this manner, the password for today can be obtained in the system. In the system, since the timing of insertion of an ID card to obtain a password is predetermined in the operating plan of the system, the ID card insertion count enables recognition of a designated date for opening. It is noted that the embodiment is not limited to the system where an every-day-based password change is obtained by inserting such an ID card, and can be applied to systems where an event is generated at regular intervals.

Next, the operation of the second embodiment according to the present invention will be explained hereafter in detail with reference to FIGS. 6 to 10.

When the user sets up the system of the transmission terminal 5 in step 701, the designated count registration means 51 displays a frame for the help of registration of a designated count (not shown in the figures). The frame for the help of registration of a designated count needs to include at least a designated count inputting region, and a designated count inputting completion button. If the user has not entered an ID card insertion count in the designated count inputting region of the designated count registration frame ("NO" in step 702), the system of the transmission terminal 5 perform a usual electronic letter transmission in step 703. If the user enters an ID card insertion count and clicks the designated count inputting completion button ("YES" in step 702), an electronic mailing based upon the designated count will be performed.

Explanation of the operation of the regular electronic mail transmission is omitted because it is similar to that of the conventional electronic mail transmission, and the operation of the electronic mail transmission based upon a designated count will be explained hereafter.

After the ID card insertion count has been entered and the designated count inputting button has been clicked in step 702, the user makes a message A to be transmitted in step 704. The designated count attachment means 52 of the transmission terminal 5 attaches the message A made by the user to the ID card insertion count into a transmission message A1 in step 705, and transmits the message A1 to the transmission server 6 in step 706.

On the other hand, the program attachment means 61 of the transmission server 6 receives the message A1 from the transmission terminal 5 in step 801, and takes out the ID card insertion count attached in the message A1, informing both the program management means 62 and the count management means 63 of it in step 802.

The program management means 62 has been stored with a message delete program B for deleting the message A in advance. When the ID card insertion count is informed in step 803, the program management means 62 generates a message delete program B1 from both the message delete program B and the ID card insertion count informed in step 803, sending it to the program attachment means 61.

The program attachment means 61 attaches the message delete program B1 sent, to message A, into a transmission message A2 in step 804, transmitting it to the reception server 7 in step 805.

When the message management means 71 of the reception server 7 receives the message A2 ("YES" in step 901), it stores the message A2 in the message storage file 72 in step 902, and transmits the message A2 to the reception terminal 8 in step 903.

The reception terminal 8 then receives the message A2 in step 1001, and waits for a request entered from the user.

In the embodiment, when the count management means 63 of the transmission server 6 transmits an electronic letter, it counts down the ID card insertion count informed by the program attachment means 61 every time when the ID card is inserted into the transmission terminal 5. The latest count after the count-down is informed to the reception terminal 8, where the count included in the program B, which has been attached to the message A2, is updated into a number equal to the latest count.

When the opening request means 81 of the reception terminal 8 is requested, to open by the user, it determines whether the count in the program B1 is equal to zero in step 1002.

If it is determined that the count is identified as a positive value, the reception terminal 8 runs the message delete program B1 so that the message A is deleted. In this situation, the reception terminal 8 informs the reception server 7 of the status that the message A has been deleted in step 1004. When the message management means 71 receives the status from the reception terminal 8 ("YES" in step 904), it takes out the message A2 from the message storage file 72 in step 905, and transmits it to the reception terminal 8 in step 903 again.

Otherwise, if it is determined that the count is identified as a negative value, the reception terminal 8 runs the message delete program B1 so that message A is deleted in step 1005.

Otherwise, if it is determined that the count is equal to zero, the message program B1 is not executed so that the message A is permitted to be opened in step 1006.

The operation of the second embodiment according to the present invention will then be terminated.

It is noted that in the embodiment, with preparation of the program B used to delete the message A, the reception terminal 8 determines whether the ID card insertion count is equal to the designated count. However, a program used for the determination can be incorporated into the program B, alternatively. Specifically, a program for executing the following operation can be contained in the program B: the operation that if the ID card insertion count is not equal to the designated count, the message A is deleted, otherwise if it is equal to the designated count, the message A is not deleted. In this situation, it is recommended that with the designated count in the program B stored in the program management means 62, to which any specific value is not set, in other words which is left as a blank, or with the designated count being defined as a variable, the blank or variable is replaced with the designated count informed by the program attachment means 61 so that the program B1 can be generated. In this manner, the reception terminal 8 unconditionally runs the program B1 on demand for opening of the message A so that whether the message A is deleted or is permitted to be opened can be determined.

Furthermore, in the embodiment, it is noted that only when the designated count registered is equal to the ID insertion count, it is permitted to open. However, with the operating configuration, when there is no request for opening on a day when a designated count of ID card insertions have been made, the message received is impossible to open. In this case, it is allowed that a transmission side transmits several messages to which several ID card insertion counts used for giving an allowance to open has been attached. However, the several same messages have to be transmitted, and accordingly it is not effective in terms of the performance. Therefore, in the embodiment, it is preferable that a designated range of counts (i.e., a designated range of multiple ID card insertion counts used for giving permission to open) is registered, and the reception terminal 4 gives permission for opening if the ID card insertion count falls within the designated count range, otherwise (if the ID card insertion count is out of the designated count range), it runs the message delete program.

Furthermore, in a modification of the embodiment, it is possible that the program B also includes a program for deleting the message A if the ID card insertion count is out of the designated range of counts whereas not deleting if it falls within the designated range of counts. In this case, it is recommended that the program B1 is generated in such a manner that, with the designated range of counts not being set and stored with specific values in the program B, as remaining blank or remaining as a variable, the blank or variable is replaced with the designated range of counts informed by the program attachment means 21. Thereby, the reception terminal 8 unconditionally runs the program B1 on demand for opening the message A so that whether the message A should be deleted or should be given permission for opening, can be determined during the procedure.

Furthermore, in the second embodiment, as shown in FIG. 6, the recording media 59, 69, 79, and 89, each being stored with an electronic mail transmission/reception program, can be prepared. The recording media 59, 69, 79, and 89 can be a magnetic disk, a semiconductor memory, or other related recording media.

The electronic mail transmission/reception programs are read out from the recording media 59, 69, 70, and 89, respectively, controlling the operations of the transmission terminal 5, the transmission server 6, the reception server 7, and the reception terminal 8. Even in this case, the operations of the transmission terminal 6, the transmission server 7, the reception server 8, and the reception terminal 9 are the same as those of the aforementioned embodiment.

As has been explained above, in the second embodiment, since the calendar function of the system is not utilized, even if the calendar or the timer of the system malfunctions, the same beneficial effects can be obtained.

According to the present invention, there is a beneficial effect that an electronic letter is surely opened on only a day or a duration when the opening is requested.

Note that many apparently widely different characteristics of the present invention can be used without departing from the spirit and scope thereof; it is to be understood that the invention is not limited to the specific features thereof; except as defined in the appended claims.

What is claimed is:

1. An electronic mail system comprising a plurality of computers, each of said plurality of computers including:
   program attachment means for transmitting an electronic letter written by a user to a computer on the receiving side, after attaching to the electronic letter a designated date when the electronic letter is allowed to be opened and a delete program which deletes the electronic letter; and
   message management means for receiving an electronic letter transmitted from a computer on the transmission side, opening the electronic letter if the current date is equal to the designated date, when requested by a user to open the electronic letter, and executing the delete program attached to the electronic letter if the current date is not equal to the designated date.

2. An electronic mail system comprising a plurality of computers, each of said plurality of computers including:
   program attachment means for transmitting an electronic letter written by a user to a computer on the receiving side, after attaching to the electronic letter a delete program which opens the electronic letter if the current date is equal to a designated date when the electronic letter is allowed to be opened and deletes the electronic letter if the current date is not equal to the designated date, and message management means for receiving an electronic letter transmitted from a computer on the transmission side, and executing the delete program attached to the electronic letter, when requested by a user to open the electronic letter.

3. An electronic mail system comprising a plurality of computers, each of said plurality of computers including:

program attachment means for transmitting an electronic letter written by a user to a computer on the receiving side, after attaching to the electronic letter a designated duration when the electronic letter is allowed to be opened and a delete program which deletes the electronic letter; and message management means for receiving an electronic letter transmitted from a computer on the transmission side, opening the electronic letter if the current date falls within the designated duration, when requested by a user to open the electronic letter, and executing the delete program attached to the electronic letter if the current date does not fall within the designated duration.

4. An electronic mail system comprising a plurality of computers, each of said plurality of computers including:

program attachment means for transmitting an electronic letter written by a user to a computer on the receiving side, after attaching to the electronic letter a delete program which opens the electronic letter if the current date falls within a designated duration when the electronic letter is allowed to be opened and deletes the electronic letter if the current date does not fall within the designated date, and message management means for receiving an electronic letter transmitted from a computer on the transmission side, and executing the delete program attached to the electronic letter, when requested by a user to open the electronic letter.

5. An electronic mail system comprising a plurality of server computers and a plurality of terminals connected to any one of said plurality of server computers, said system comprising:

said terminals, each including attachment means for attaching a designated date indicating when opening an electric mail is allowed, to the electronic mail input by a user, and transmitting it to a server computer connected to its own terminal; and said plurality of server computers, each including:
program management means for storing a delete program used to delete electronic mail,
program attachment means for receiving electronic mail, to which the designated date for opening the message has been attached, from a terminal connected to its own server computer, and attaching the delete program to the electronic mail, and transmitting it to a server computer on the receiving side, and
message management means for receiving electronic mail, to which a delete program has been attached, from a server computer on the transmission side, and transmitting the electronic mail with the attachment to a terminal connected to its server computer;

wherein, each of said plurality of terminals further includes open mail means for receiving electronic mail, to which both the designated date for opening the mail and the delete program have been attached, from a server connected to its own terminal, and processing the open mail on demand input by the user for opening the electronic mail, in such a manner that: if the current date is equal to the designated date for opening attached to the electronic mail, the electronic mail is opened; otherwise, the delete program attached to the electronic mail is executed.

6. An electronic mail system, which transmits and receives electronic mail between terminals, connected to two servers of choice respectively from a plurality of server computers making up a network system, via the two servers, comprising:

said terminals, each including attachment means for transmitting electronic mail input by a user along with a designated date indicating when opening the electronic mail is allowed, to a server computer connected to its own terminal; and said plurality of server computers, each including:
program management means for storing a program used either to open electronic mail if the current date is equal to the designated date, or to delete the electronic mail, otherwise,
program attachment means for receiving the electronic mail from a terminal connected to its own server, attaching data obtained by replacing the given date with the received designated date for opening the electronic mail, and transmitting the selected attachment and electronic mail to a server computer on the receiving side, and
message management means for receiving the electronic mail, to which the delete program has been attached, from a server computer on the transmission side, and transmitting the electronic mail with the attachment to a terminal connected to its own server;

wherein, each of the said plurality of terminals further includes open mail means for receiving electronic mail, to which the delete program has been attached, from a server connected to its own terminal, and executing the delete program attached to the electronic mail designated by the user for opening the electronic mail.

7. An electronic mail system, which transmits and receives electronic mail between terminals, connected to two optional servers respectively from a plurality of server computers making up a network system, via the two servers, comprising:

said terminals, each including attachment means for attaching a designated duration for opening an electronic mail indicating when opening electronic mail is allowed, to an electronic mail input by a user, and transmitting it to a server connected to its own terminal; and said plurality of servers, each including:
program management means for storing a delete program used to delete electronic mail,
program attachment means for receiving the electronic mail, to which a designated date for opening the mail has been attached, from a terminal connected to a server, attaching the delete program to the electronic mail, and transmitting it to a server on the receiving side, and
message management means for receiving electronic mail, to which both a designated duration for opening the electronic mail and the delete program have been attached, from a server on the transmission side, and transmitting the electronic mail with the attachment to a terminal connected to a server;

wherein, each of said terminals further includes message-open request means for receiving electronic mail, to which both the designated duration of opening the electronic mail and the delete program have been attached, from a server connected to its own terminal, and either opening the electronic mail if the current date does not fall within the designated duration attached to the electronic mail, or executing the delete program attached to the electronic mail if otherwise, on request made by the user for opening the electronic mail.

8. An electronic mail system, which transmits and receives electronic mail between terminals, connected to respective two optional server computers from a plurality of server computers making up a network system, via the two server computers, comprising:

said terminals, each including attachment means for transmitting an electronic mail input by a user along with a designated duration indicating when opening the electronic mail is allowed, to a server connected to its own terminal; and said plurality of server computers, each including:

program management means for storing a program used either to open electronic mail if the current date falls within a given duration, or to delete the electronic mail, otherwise, program attachment means for receiving the electronic mail from a terminal connected to its own server computer, attaching data obtained by replacing the given duration with the received designated date of opening the electronic mail, to the electronic mail, and transmitting it to a server on the receiving side, and message management means for receiving the electronic mail, to which the delete program has been attached, from a server on the transmission side, and transmitting the electronic mail with the attachment to a terminal connected to its own server computer;

wherein, each of said plurality of terminals further includes a message-open request means for receiving electronic mail, to which the delete program has been attached, from a server connected to its own terminal, and executing the delete program attached to the electronic mail, on request made by the user for opening the electronic mail.

9. The electronic mail system as claimed in claim 5, wherein:

the message management means of the plurality of server computers stores electronic mail received from a server on the transmission side, in a message-storage file;

when the electronic mail is deleted, the mail-open request means of the plurality of terminals runs the delete program attached to the electronic mail so that its status is informed to the message management means; and when the message management means of the plurality of server computers receives from a terminal connected to its own server, the status that the electronic mail has been deleted, it transmits the electronic mail stored in the message storage file, to the terminal.

10. An electronic mail system, which transmits and receives electronic mail between two optional computers from a plurality of computers making up a network system, comprising said plurality of computers, each including:

program attachment means for attaching both an event generated count, which is used to identify a date indicating when opening the electronic mail is allowed, and a delete program used to delete electronic mail, to an electronic mail input by a user, and transmitting the electronic mail with the attachment to a computer on the receiving side; and message management means for receiving the electronic mail transmitted from a computer on the transmission side, and then processing on request made by the user for permission to open the electronic mail, in such a manner that: if the event generated count until now is equal to that attached to the electronic mail, the electronic mail is allowed to be opened; or otherwise, the delete program attached to the electronic mail is executed.

11. An electronic mail system, which transmits and receives electronic mail between two optional computers from a plurality of computers making up a network system, comprising said plurality of computers, each including:

program attachment means for attaching a delete program to an electronic mail input by a user, and transmitting the electronic mail with the attachment to a computer on the receiving side, wherein the delete program is used either to open electronic mail if the event generated count until today, which is used to identify a date allowable to open electronic mail, is equal to that attached to the electronic mail, or to delete the electronic mail if otherwise; and message management means for receiving the electronic mail from a computer on the transmission side, and then executing the delete program attached to the electronic mail on request made by the user for permission to open an electronic mail.

12. An electronic mail system, which transmits and receives electronic mail between two optional computers from a plurality of computers making up a network system, comprising said plurality of computers, each including:

program attachment means for attaching both a range of event generated counts, which is used to identify a date indicating when opening electronic mail is allowed, and a delete program used to delete electronic mail, to an electronic mail input by a user, and transmitting the electronic mail with the attachment to a computer on the receiving side; and message management means for receiving the electronic mail from a computer on the transmission side, and either opening the electronic mail if the event generated count until today falls within the range of event generated counts attached to the electronic mail, or executing the delete program attached to the electronic mail if otherwise, on request made by the user for permission to open an electronic mail.

13. An electronic mail system, which transmits and receives electronic mail between two optional computers from a plurality of computers making up a network system, comprising said plurality of computers, each including:

program attachment means for attaching a delete program to an electronic mail input by a user, and transmitting the electronic mail with the attachment to a computer on the receiving side, wherein the delete program is used either to open electronic mail if an event generated count until today, which is used to identify a date indicating when opening electronic mail is allowed, falls within given values, or to delete the electronic mail if otherwise; and message management means for receiving the electronic mail from a computer on the transmission side, and executing the delete program attached to the electronic mail on request made by the user for permission to open an electronic mail.

14. An electronic mail system, which transmits and receives electronic mail between terminals, connected to respectively two server computers from a plurality of server computers making up a network system, via the two server computers, comprising:

said terminals, each including designated count attachment means for attaching an event generated count, which is used to identify a date indicating when opening an electronic mail is allowed, to an electronic mail input by a user, and transmitting the electronic mail with the attachment to a server connected to its own terminal; and said plurality of server computers, each including:
program management means for storing delete program used to delete the electronic mail,
program attachment means for receiving the electronic mail from a terminal connected to its own server computer, attaching the delete program to the electronic mail, and transmitting the electronic mail with the attachment to a server on the receiving side, and
message management means for receiving the electronic mail, to which both the event generated count and the delete program have been attached, from a server on the transmission side, and transmitting the electronic mail with the attachment to a terminal connected to its own server computer;

wherein, each of said plurality of terminals further includes mail opening request means for receiving the electronic mail, to which the delete program has been attached, from a server connected to its own terminal, and executing the delete program attached to the electronic mail on request made by the user for permission to open the electronic mail.

15. An electronic mail system, which transmits and receives electronic mail between terminals, connected to respectively two optional server computers from a plurality of server computers making up a network system, via the two server computers, comprising:

said terminals, each including designated count attachment means for transmitting both an electronic mail and an event generated count, which is used to identify a date indicating when opening the electronic mail is allowed, to a server connected to its own terminal; and said plurality of server computers, each including:
program management means for storing a program used either to open with permission, electronic mail if the event generated count until today is equal to a given value, or to delete the electronic mail if otherwise,
program attachment means for receiving the electronic mail from a terminal connected to its own server computer, attaching data, obtained by replacing the given value with the event generated count received, to the electronic mail, and transmitting the electronic mail with the attachment to a server on the receiving side, and
message management means for receiving the electronic mail, to which the delete program has been attached, from a server on the transmission side, and transmitting the electronic mail with the attachment to a terminal connected to its own server computer;

wherein, each of said plurality of terminals further includes mail opening request means for receiving the electronic mail, to which the delete program has been attached, from a server connected to its own terminal, and executing the delete program attached to the electronic mail on request made by the user for permission to open the electronic mail.

16. An electronic mail system, which transmits and receives electronic mail between terminals, connected to respective two optional server computers from a plurality of server computers making up a network system, via the two server computers, comprising:

said terminals, each including designated count attachment means for attaching an event generated count, which is used to identify a date indicating when opening an electronic mail is allowed, to an electronic mail input by a user, and transmitting the electronic mail with the attachment, to a server connected to its own terminal; and said plurality of server computers, each including:
program management means for storing delete program used to delete electronic mail,
program attachment means for receiving the electronic mail, to which a range of event generated counts has been attached, from a terminal connected to its own server computer, attaching the delete program to the electronic mail, and transmitting the electronic mail with the attachment to a server on the receiving side, and
message management means for receiving the electronic mail, to which both the range of event generated counts and the delete program have been attached, from a server on the transmission side, and transmitting the electronic mail with the attachment to a terminal connected to its own server computer;

wherein, each of said plurality of terminals further includes mail opening request means for receiving the electronic mail, to which both the range of event generated counts and the delete program have been attached, from a server connected to its own terminal, and either opening the electronic mail if the event generated count until today falls within the range of event generated counts attached to the electronic mail, or to run the delete program attached to the electronic mail if otherwise, on request made by the user for permission to open the electronic mail.

17. An electronic mail system, which transmits and receives electronic mail between terminals, connected to respective two optional server computers from a plurality of server computers making up a network system, via the two server computers, comprising:

said terminals, each including designated count attachment means for transmitting an electronic mail input by a user along with a range of event generated counts, which is used to identify a date indicating when opening an electronic mail is allowed, to a server connected to its own terminal; and said plurality of server computers, each including:
program management means for storing a program used either to open electronic mail if the event generated count until today falls within a given range of counts, or to delete the electronic mail if otherwise,
program attachment means for receiving the electronic mail from a terminal connected to its own server computer, attaching data, obtained by replacing the given range of counts with the range of event generated counts, to the electronic mail, and transmitting the electronic mail with the attachment to a server on the receiving side, and message management means for receiving the electronic mail, to which the delete program has been attached, from a server on the transmission side, and transmitting the attached electronic mail with the attachment to a terminal connected to its own server computer;

wherein, each of said plurality of terminals further includes mail opening request means for receiving the electronic mail, to which the delete program has been attached, from a server connected to its own terminal, and executing the delete program attached to the electronic mail if otherwise, on request made by the user for permission to open the electronic mail.

18. The electronic mail system as claimed in claim 14, wherein:

each of said terminals comprises a means to detect generation of the event and to inform a server connected to its own terminal, of the status;

each of the plurality of sever computers comprises both a means, which saves the event generated count attached to the electronic mail, which has been received from a terminal connected to its own server computer, counts down the event generated count saved every time when the event is informed from the terminal, and transmits a resulting count information to a server on the receiving side, and a means, which transmits the count information, received from the server computer on the transmission side, to a terminal connected to its own server computer; and each of said terminals further comprises a means to receive the count information from a server connected to its own terminal, and to replace the event generated count attached to the electronic mail received by the mail opening request means, with the count information.

19. The electronic mail system as claimed in claim 15, wherein:

each of said terminals comprises a means to detect generation of the event and to inform a server connected to its own terminal, of the status;

each of the plurality of sever computers comprises both a means, which saves both the electronic mail and the event generated count received from a terminal connected to its own server, counts down the event generated count saved every time when the event is informed from the terminal, and transmits a resulting count information to a server on the receiving side, and a means, which transmits the count information, received from the server computer on the transmission side, to a terminal connected to its own server computer; and each of said terminals further receives the count information from a server connected to its own terminal, replacing the event generated count in the delete program attached to the electronic mail received by the mail opening request means, with the count information.

20. The electronic mail system as claimed in claim 14, wherein:

the message management means of the plurality of server computers stores the electronic mail, received from a server on the transmission side, in a message storage file;

the mail opening request means of the terminals runs the delete program attached to the electronic mail so that when the electronic mail is deleted, its status is informed the message management means of the server computer connected to its own terminal; and the message management means of the plurality of server computers transmits the electronic mail stored in the message storage file to the terminal, when the status that the electronic mail has been deleted is informed from the terminal connected to its own server computer.

21. A method of transmitting and receiving an electronic mail between two optional computers from a plurality of computers making up a network system, comprising the steps of:

attaching both a designated date indicating when opening an electronic mail is allowed, and a delete program which deletes electronic mail, to an electronic mail input by a user, and transmitting the electronic mail with the attachment to a computer on the receiving side; and receiving the electronic mail from a computer on the transmission side, and then either opening the electronic mail if the current date is equal to a designated date for opening attached to the electronic mail, or executing the delete program attached to the electronic mail if otherwise, on request made by the user for permission to open the electronic mail.

22. A method of transmitting and receiving electronic mail between two optional computers from a plurality of computers making up a network system, comprising the steps of:

attaching a delete program to an electronic mail input by a user, and transmitting the electronic mail with the attachment to a computer on the receiving side; wherein the delete program is configured to process in such a manner that: if the current date is equal to a designated date indicating when opening an electronic mail is allowed, the electronic mail is opened; if otherwise, the electronic mail is deleted; and receiving the electronic mail from a computer on the transmission side, and then executing the delete program attached to the electronic mail on request made by a user for permission to open the electronic mail.

23. A method of transmitting and receiving an electronic mail between two optional computers from a plurality of computers making up a network system, comprising the steps of:

attaching both a designated duration indicating when opening electronic mail is allowed, and a delete program which deletes electronic mail, to an electronic mail input by a user, and transmitting the electronic mail with the attachment to a computer on the receiving side; and receiving the electronic mail from a computer on the transmission side, and then processing on request made by the user for permission to open the electronic mail in such a manner that: if the current date falls within a designated duration for opening the electronic mail attached to the electronic mail, the electronic mail is opened; if otherwise, the delete program attached to the electronic mail is executed.

24. A method of transmitting and receiving an electronic mail between two optional computers from a plurality of computers making up a network system, comprising the steps of:

attaching a delete program which deletes electronic mail, to an electronic mail input by a user, and transmitting the electronic mail with the attachment to a computer on the receiving side, wherein the delete program is used either to open an electronic mail if the current date falls within a designated duration indicating when opening electronic mail is allowed, or to delete the electronic mail if otherwise; and receiving the electronic mail from a computer on the transmission side, and executing the delete program attached to the electronic mail on request made by the user for permission to open the electronic mail.

25. A method of transmitting and receiving an electronic mail between two optional computers from a plurality of computers making up a network system, comprising the steps of:

attaching both an event generated count, which is used to identify a date indicating when opening an electronic mail is allowed, and a delete program used to delete electronic mail, to an electronic mail input by a user, and transmitting the electronic mail with the attachment to a computer on the receiving side; and receiving the electronic mail from a computer on the transmission side, and then processing on request made by the user for permission to open the electronic mail, in such a manner that: if the event generated count until today is equal to that attached to the electronic mail, the electronic mail is opened; if otherwise, the delete program attached to the electronic mail is executed.

26. A method of transmitting and receiving an electronic mail between two optional computers from a plurality of computers making up a network system, comprising the steps of:

attaching a delete program to an electronic mail input by a user, and transmitting the electronic mail with the attachment to a computer on the receiving side, wherein the delete program is used either to open electronic mail if the event generated count until today, which is used to identify a date allowable to open electronic mail, is equal to that attached to the electronic mail, or to delete the electronic mail if otherwise; and receiving the electronic mail from a computer on the transmission side, and then executing the delete program attached to the electronic mail on request made by the user for permission to open an electronic mail.

27. A method of transmitting and receiving an electronic mail between two optional computers from a plurality of computers making up a network system, comprising the steps of:

attaching both a range of event generated counts and a delete program used to delete electronic mail, to an electronic mail input by a user, and transmitting the electronic mail with the attachment to a computer on the receiving side; and receiving the electronic mail from a computer on the transmission side, and either opening the electronic mail if the event generated count until today falls within the range of event generated counts attached to the electronic mail, or executing the delete program attached to the electronic mail if otherwise, on request made by the user for permission to open an electronic mail.

28. A method of transmitting and receiving an electronic mail between two optional computers from a plurality of computers making up a network system, comprising the steps of:

attaching a delete program to an electronic mail input by a user, and transmitting the electronic mail with the attachment to a computer on the receiving side, wherein the delete program is used either to open electronic mail if an event generated count until today, which is used to identify a date indicating when opening an electronic mail is allowed, falls within given values, or to delete the electronic mail if otherwise; and receiving the electronic mail from a computer on the transmission side, and executing the delete program attached to the electronic mail on request made by the user for permission to open an electronic mail.

29. A storage medium recording thereon a program enabling each of a plurality of computers which make up a network system, to execute the processes of:

attaching both a designated date indicating when opening an electronic mail is allowed, and a delete program which deletes electronic mail, to an electronic mail input by a user, and transmitting the electronic mail with the attachment to a computer on the receiving side; and receiving an electronic mail from a computer on the transmission side, and on request made by the user for permission to open the electronic mail, either opening the electronic mail if the current date is equal to a designated date for opening attached to the electronic mail, or executing the delete program attached to the electronic mail if otherwise.

30. A storage medium recording thereon a program enabling each of a plurality of computers which make up a network system, to execute the processes of:

attaching a delete program to an electronic mail input by a user, and transmitting the electronic mail with the attachment to a computer on the receiving side; wherein the delete program is configured to process in such a manner that: if the current date is equal to a designated date indicating when opening an electronic mail is allowed, the electronic mail is opened; if otherwise, the electronic mail is deleted; and receiving the electronic mail from a computer on the transmission side, and then executing the delete program attached to the electronic mail on request made by a user for permission to open the electronic mail.

31. A storage medium recording thereon a program enabling each of a plurality of computers which make up a network system, to execute the processes of:

attaching both a designated duration indicating when opening electronic mail is allowed, and a delete program which deletes electronic mail, to an electronic mail input by a user, and transmitting the electronic mail with the attachment to a computer on the receiving side; and receiving the electronic mail from a computer on the transmission side, and then on request made by the user for permission to open the electronic mail, either opening the electronic mail if the current date falls within a designated duration for opening attached to the electronic mail, or executing the delete program attached to the electronic mail if otherwise.

32. A storage medium recording thereon a program enabling each of a plurality of computers which make up a network system, to execute the processes of:

attaching a delete program which deletes electronic mail, to an electronic mail input by a user, and transmitting the electronic mail with the attachment to a computer on the receiving side, wherein the delete program is used either to open electronic mail if the current date falls within a designated duration indicating when opening electronic mail is allowed, or to delete the electronic mail if otherwise; and receiving the electronic mail from a computer on the transmission side, and executing the delete program attached to the electronic mail on request made by the user for permission to open the electronic mail.

33. A storage medium recording thereon a program enabling each of a plurality of computers which make up a network system, to execute the processes of:

attaching both an event generated count, which is used to identify a date indicating when opening an electronic mail is allowed, and a delete program used to delete electronic mail, to an electronic mail input by a user, and transmitting the electronic mail with the attachment to a computer on the receiving side; and receiving the electronic mail transmitted from a computer on the transmission side, and then on request made by the user for permission to open the electronic mail, either opening the electronic mail if the event generated count until today is equal to that attached to the electronic mail, or executing the delete program attached to the electronic mail if otherwise.

34. A storage medium recording thereon a program enabling each of a plurality of computers which make up a network system, to execute the processes of:

attaching a delete program to an electronic mail input by a user, and transmitting the electronic mail with the attachment to a computer on the receiving side, wherein the delete program is used either to open electronic mail if an event generated count until today, which is used to identify a date indicating when opening electronic mail is allowed, is equal to a given value, or to delete the electronic mail if otherwise; and receiving the electronic mail from a computer on the transmission side, and then executing the delete program attached to the electronic mail on request made by the user for permission to open an electronic mail.

35. A storage medium recording thereon a program enabling each of a plurality of computers which make up a network system, to execute the processes of:

attaching both a range of event generated counts, which is used to identify a date indicating when opening an electronic mail is allowed, and a delete program used to delete electronic mail, to an electronic mail input by a user, and transmitting the electronic mail with the attachment to a computer on the receiving side; and receiving the electronic mail from a computer on the transmission side, and either opening the electronic mail if the event generated count until today falls within the range of event generated counts attached to the electronic mail, or executing the delete program attached to the electronic mail, if otherwise, on request made by the user for permission to open an electronic mail.

36. A storage medium recording there on a program enabling each of a plurality of computers which make up a network system, to execute the processes of:

attaching a delete program to an electronic mail input by a user, and transmitting the electronic mail with the attachment to a computer on the receiving side, wherein the delete program is used either to open electronic mail if an event generated count until today, which is used to identify a date indicating when opening an electronic mail is allowed, falls within given values, or to delete the electronic mail if otherwise; and receiving the electronic mail from a computer on the transmission side, and executing the delete program attached to the electronic mail on request made by the user for permission to open an electronic mail.

* * * * *